United States Patent
Hatakeyama et al.

(10) Patent No.: US 11,486,292 B2
(45) Date of Patent: Nov. 1, 2022

(54) EXHAUST-GAS PURIFICATION SYSTEM OF INTERNAL COMBUSTION ENGINE

(71) Applicant: HONDA MOTOR CO., LTD., Tokyo (JP)

(72) Inventors: Yoshiaki Hatakeyama, Wako (JP); Hiroki Takeori, Wako (JP); Tetsuo Endo, Wako (JP); Shun Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/193,157

(22) Filed: Mar. 5, 2021

(65) Prior Publication Data

US 2021/0285358 A1   Sep. 16, 2021

(30) Foreign Application Priority Data

Mar. 11, 2020   (JP) .............................. JP2020-042298

(51) Int. Cl.
*F01N 3/00* (2006.01)
*F01N 13/00* (2010.01)
(Continued)

(52) U.S. Cl.
CPC ..... *F01N 13/0093* (2014.06); *B01D 53/9445* (2013.01); *B01J 37/0244* (2013.01); *F01N 3/035* (2013.01); *F01N 3/2006* (2013.01)

(58) Field of Classification Search
CPC .... F01N 13/0093; F01N 3/035; F01N 3/2006; F01N 2330/02; F01N 2330/60;
(Continued)

(56) References Cited

U.S. PATENT DOCUMENTS 5,758,498 A * 6/1998 Fukui .................... F01N 3/2814
422/174
2002/0042344 A1* 4/2002 Kondo ...................... F01N 3/28
502/251
(Continued)

FOREIGN PATENT DOCUMENTS

JP     H05-179939 A    7/1993
JP     H06-81638 A     3/1994
(Continued)

OTHER PUBLICATIONS

Office Action dated Oct. 19, 2021, issued in counterpart JP Application No. 2020-042298, with English Translation. (14 pages).
(Continued)

*Primary Examiner* — Matthew T Largi
(74) *Attorney, Agent, or Firm* — WHDA, LLP (57) ABSTRACT

An exhaust-gas purification system of an internal combustion engine includes an electrically heated catalytic device and a three-way catalytic device. The electrically heated catalytic device includes a first honeycomb base having a large number of honeycomb passages and a first catalyst component that is supported on, by a predetermined thin-film treatment, surfaces that define the honeycomb passages and that contains one or more types of noble metals. The three-way catalytic device includes a second honeycomb base having a large number of honeycomb passages and a second catalyst component that is supported on surfaces defining the honeycomb passages and that contains one or more types of noble metals. The total noble metal content per unit volume of the second honeycomb base is higher than the total noble metal content per unit volume of the first honeycomb base.

13 Claims, 4 Drawing Sheets

(51) Int. Cl.
  *F01N 3/035* (2006.01)
  *B01D 53/94* (2006.01)
  *B01J 37/02* (2006.01)
  *F01N 3/20* (2006.01)

(58) Field of Classification Search
  CPC ...... F01N 3/101; F01N 3/2013; F01N 3/2026; F01N 3/281; F01N 13/009; B01D 53/9445; B01J 37/0244
  See application file for complete search history.

(56) References Cited

U.S. PATENT DOCUMENTS

| | | | |
|---|---|---|---|
| 2004/0003723 A1* | 1/2004 | Ueno | B01D 53/0454 96/111 |
| 2017/0197179 A1* | 7/2017 | Yoshikawa | B01J 37/0236 |

FOREIGN PATENT DOCUMENTS

| | | | | |
|---|---|---|---|---|
| JP | H11-315716 | A | | 11/1999 |
| JP | 2002-177794 | A | | 6/2002 |
| JP | 2009-275559 | A | | 11/2009 |
| JP | 2009275559 | A | * | 11/2009 |
| JP | 2013-76327 | A | | 4/2013 |
| JP | 2013076327 | A | * | 4/2013 |
| JP | 2014-147879 | A | | 8/2014 |
| JP | 2020-15014 | A | | 1/2020 |
| WO | 2015/182726 | A1 | | 12/2015 |
| WO | 2017/033994 | A1 | | 3/2017 |
| WO | WO-2017033994 | A1 | * | 3/2017 ............ B01D 53/94 |

OTHER PUBLICATIONS

Office Action dated Jul. 5, 2022, issued in counterpart JP Application No. 2020-042298, with English Translation. (15 pages).

* cited by examiner

EXHAUST-GAS PURIFICATION SYSTEM OF INTERNAL COMBUSTION ENGINE

CROSS REFERENCES TO RELATED APPLICATIONS

The present application claims priority under 35 U.S.C. § 119 to Japanese Patent Application No. 2020-042298, filed Mar. 11, 2020, entitled "Exhaust-Gas Purification System of Internal Combustion Engine." The contents of this application are incorporated herein by reference in their entirety.

TECHNICAL FIELD

The present disclosure relates to an exhaust-gas purification system of an internal combustion engine that purifies an exhaust gas emitted from the internal combustion engine by using a catalyst.

BACKGROUND

In recent years, as a catalyst that is used in an exhaust-gas purification system of an internal combustion engine, a metal foil catalyst formed by providing a catalyst layer on metal foil has been developed, and the configuration of the metal foil catalyst and a method of manufacturing the metal foil catalyst are described in International Publication No. WO2017/033994. Note that the metal foil catalyst is the result of a project commissioned by the Ministry of Education, Culture, Sports, Science and Technology (Element Strategy Initiative: To Form Core Research Centers).

In the metal foil catalyst described in International Publication No. WO2017/033994, the metal foil is made of a stainless steel, aluminum, titanium, or the like, and a thickness Ts of the metal foil is set to 5 μm to 70 μm. The catalyst layer is made of, for example, rhodium, palladium, platinum, silver, iridium, or an alloy containing one or more of these, and a thickness Tc of the catalyst layer is set to 0.001 μm to 1 μm, and the thickness Ts of the metal foil and the thickness Tc of the catalyst layer satisfy a relationship of Ts/Tc>20.

In the manufacture of the metal foil catalyst, arc discharge or the like is used, and a material for forming the catalyst layer is evaporated onto the metal foil.

In a catalytic converter that is formed by using and processing the above-described metal foil catalyst so as to have a large number of honeycomb passages, the metal foil and the catalyst layer each have a small thickness, and thus, the pressure loss of the exhaust gas that flows into the catalytic converter can be reduced. In addition, by forming the catalyst layer such that the catalyst layer has a small thickness, the amount of a noble metal used for forming the catalyst layer can be reduced, and the manufacturing costs can be reduced.

SUMMARY

In the above-described catalytic converter, however, if the exhaust gas flows into the honeycomb passages in the state where the activation of the catalyst layer is insufficient, harmful components (HC, CO, NOx) contained in the exhaust gas will be discharged to the outside. In recent years, the number of hybrid vehicles powered by internal combustion engines and motors has been increased, and when the power source of such a vehicle is switched from a motor to an internal combustion engine while the vehicle is driven, there is a possibility that purification of exhaust gas will be insufficient due to a low temperature of a catalyst layer.

The present application describes, for example, an exhaust-gas purification system of an internal combustion engine capable of improving its overall exhaust gas purification performance while ensuring a reduction in the pressure loss of an exhaust gas that flows through an exhaust passage and a cost reduction.

An exhaust-gas purification system of an internal combustion engine according to an aspect of the present disclosure includes a first catalytic device (an electrically heated catalytic device 4 in an embodiment (hereinafter, the same applies in this section)) that is disposed in an exhaust passage of an internal combustion engine and a second catalytic device (a three-way catalytic device 5) that is disposed in the exhaust passage in such a manner as to be positioned downstream from the first catalytic device. The first catalytic device and the second catalytic device purifies an exhaust gas that flows through the exhaust passage. The first catalytic device includes a first support base (a honeycomb base 16) that is made of a certain type of metal and that has a large number of honeycomb passages through which the exhaust gas flows and a first catalyst component that is supported on surfaces of the first support base, the surfaces defining the honeycomb passages, by a predetermined thin-film treatment and that contains one or more certain types of noble metals. The second catalytic device includes a second support base (a honeycomb base 26) that has a large number of honeycomb passages through which the exhaust gas flows and a second catalyst component that is supported on surfaces of the second support base, the surfaces defining the honeycomb passages, and that contains one or more certain types of noble metals. The total noble metal content per unit volume of the second support base is higher than the total noble metal content per unit volume of the first support base.

According to this configuration, as the exhaust-gas purification system, the first catalytic device is disposed in the exhaust passage of the internal combustion engine, and the second catalytic device is disposed downstream from the first catalytic device. The first catalyst component containing one or more certain types of noble metals is supported on the surfaces of the first support base of the first catalytic device defining the honeycomb passages. Since the first catalyst component is supported on the first support base by the predetermined thin-film treatment, the first catalyst component can be formed so as to be very thin. As a result, the amount of the one or more certain types of noble metals contained in the first catalyst component can be reduced, and the passage area of each of the honeycomb passages can be increased, so that the pressure loss of the exhaust gas that passes through the first catalytic device can be reduced.

In contrast, the second catalyst component containing one or more certain types of noble metals is supported on the surfaces of the second support base of the second catalytic device defining the honeycomb passages. The total noble metal content per unit volume of the second support base is higher than the total noble metal content per unit volume of the first support base. As a result, the exhaust-gas purification performance of the second catalytic device can be improved. Therefore, according to the present disclosure, the exhaust-gas purification performance of the entire exhaust-gas purification system can be improved while ensuring a reduction in the pressure loss of the exhaust gas that flows through the exhaust passage and a cost reduction.

In the exhaust-gas purification system of an internal combustion engine according to the aspect of the present disclosure, a noble metal contained in the first catalyst component may be rhodium, and a noble metal contained in the second catalyst component may be palladium and/or platinum.

According to this configuration, the first catalyst component that is formed so as to be thin by the thin-film treatment contains rhodium. Rhodium has been more expensive than either palladium or platinum in recent years, and the first catalyst component containing rhodium is formed so as to be thin, so that the amount of rhodium used can be reduced, and a cost reduction can be further facilitated compared with a catalytic device of the related art. In addition, rhodium is the most effective material for a thin film catalyst, and as a result of rhodium being contained in the first catalyst component by the thin-film treatment, a high purification performance can be provided.

The exhaust-gas purification system of an internal combustion engine according to the aspect of the present disclosure may further include a heating unit (a battery 7, an ECU 8, and electrodes 13) that heats the first support base by supplying power to the first support base, and the first support base may be configured to be electrically heatable. In the first catalytic device, an electrode of the heating unit may be electrically connected to the first support base, and an amount per unit volume of the first catalyst component supported on a downstream-side half portion (a downstream-side region Ltd) of the first support base may be larger than an amount per unit volume of the first catalyst component supported on an upstream-side half portion of the first support base.

According to this configuration, in the first catalytic device, since the electrode of the heating unit is electrically connected to the first support base, the first support base can be quickly heated by supplying power to the first support base through the electrode. In addition, in the first support base, the amount per unit volume of the first catalyst component supported on the downstream-side half portion is larger than the amount per unit volume of the first catalyst component supported on the upstream-side half portion. In other words, the density of the first catalyst component in the upstream-side half portion of the first support base is low. As a result, the efficiency of heating the first support base can be improved.

Furthermore, the exhaust gas that has been efficiently heated on the upstream side of the first support base flows into the downstream-side half portion having an improved purification performance, and thus, the first catalytic device can further efficiently purify the exhaust gas.

The exhaust-gas purification system of an internal combustion engine according to the aspect of the present disclosure may further include a heating unit that heats the first support base by supplying power to the first support base, and the first support base may be configured to be electrically heatable. Brazing may be performed in a first region that extends from an upstream end of the first support base toward a downstream side so as to have a predetermined length, and the first catalyst component may be supported on a second region of the first support base that is positioned downstream from the first region.

According to this configuration, brazing similar to that performed in a common catalytic device is performed in the first support base in order to define the honeycomb passages. More specifically, a metal foil member having a flat plate-like shape (flat foil member) and a metal foil member having a corrugated plate-like shape (corrugated foil member) are joined to each other by brazing. According to the above-described configuration, in the first region of the first support base extending from the upstream end of the first support base toward the downstream side so as to have the predetermined length, the flat foil member and the corrugated foil member are brazed together. In contrast, the first catalyst component is supported on the second region of the first support base that is positioned downstream from the first region. In other words, in the first support base, brazing is performed on the upstream side, and the first catalyst component is supported on the downstream-side region excluding the region in which brazing is performed. When the first support base is heated by the heating unit, the upstream-side portion of the first support base can be efficiently heated, and as a result, the exhaust gas that has been heated by passing through the upstream-side portion flows into the downstream-side portion of the first support base on which the first catalyst component is supported, so that the exhaust gas can be efficiently purified.

The exhaust-gas purification system of an internal combustion engine according to the aspect of the present disclosure may further include a heating unit that heats the first support base by supplying power to the first support base, and the first support base may be configured to be electrically heatable. In a radial direction of the first support base, an amount per unit volume of the first catalyst component supported on a central region of the first support base may be larger than an amount per unit volume of the first catalyst component supported on an outer peripheral region of the first support base that is located outside the central region.

According to this configuration, in the radial direction of the first support base, the amount per unit volume of the first catalyst component supported on the central region is larger than that on the outer peripheral region. In the state where the first support base is heated by the heating unit, when the exhaust gas having a temperature lower than the temperature of the first support base flows into the first catalytic device, the central region of the first support base may sometimes be cooled more than the outer peripheral region in the radial direction of the first support base. Thus, as described above, by setting the amount per unit volume of the first catalyst component supported on the central region of the first support base in the radial direction to be larger than that on the outer peripheral region of the first support base, the activating temperature in the central region is set to be low, so that the catalytic activity effect of the first catalytic device in the radial direction can be uniformly improved.

The exhaust-gas purification system of an internal combustion engine according to the aspect of the present disclosure may further include an unburned-constituent adsorbent (an HC adsorbent 3) that is disposed in the exhaust passage in such a manner as to be positioned upstream from the first catalytic device, the unburned-constituent adsorbent being configured to adsorb an unburned constituent contained in the exhaust gas when a temperature of the unburned-constituent adsorbent is lower than a predetermined first temperature and configured to desorb the unburned constituent when the temperature of the unburned-constituent adsorbent is equal to or higher than the first temperature. The heating unit may start energization when the temperature of the unburned-constituent adsorbent is equal to or lower than a predetermined second temperature that is lower than the first temperature.

According to this configuration, the unburned-constituent adsorbent is disposed in the exhaust passage in such a manner as to be positioned upstream from the first catalytic device. The unburned-constituent adsorbent adsorbs an unburned constituent (e.g., hydrocarbon (HC)) contained in the exhaust gas when the temperature of the unburned-constituent adsorbent is lower than the predetermined first temperature and desorbs the unburned constituent, that has been adsorbed thereby once, when the temperature of the unburned-constituent adsorbent is equal to or higher than the first temperature. The heating unit starts energization when the temperature of the unburned-constituent adsorbent is equal to or lower than the predetermined second temperature that is lower than the first temperature. As a result, before the unburned-constituent adsorbent starts desorbing the unburned constituent, the first support base of the first catalytic device is heated, and the temperature of the first support base is increased, so that activation of the first catalyst component can be facilitated.

In the exhaust-gas purification system of an internal combustion engine according to the aspect of the present disclosure, the predetermined thin-film treatment may be one of arc discharge, sputtering, ion plating, vacuum deposition, and plating treatment.

According to this configuration, by employing one of arc discharge, sputtering, ion plating, vacuum deposition, and plating treatment as the thin-film treatment for causing the first catalyst component to be supported on the first support base, a thin-film-shaped first catalyst component can be easily formed on the first support base.

In the exhaust-gas purification system of an internal combustion engine according to the aspect of the present disclosure, a thickness of the first catalyst component may be 0.001 μm to 10 μm.

According to this configuration, since the thickness of the first catalyst component is 0.001 μm to 10 μm, a reduction in the pressure loss of the exhaust gas and a cost reduction can be facilitated while ensuring the exhaust-gas purification function of the first catalytic device.

In the exhaust-gas purification system of an internal combustion engine according to the aspect of the present disclosure, the thickness of the first catalyst component may be smaller than 1 μm.

According to this configuration, by setting the thickness of the first catalyst component to be smaller than 1 μm, a reduction in the pressure loss of the exhaust gas and a cost reduction can be further facilitated compared with the case where the thickness of the first catalyst component is set to 1 μm or larger. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

FIG. 2(a) illustrates the electrically heated catalytic device when viewed from an upstream side, and FIG. 2(b) is a longitudinal sectional view of the electrically heated catalytic device.

FIG. 4A illustrates the three-way catalytic device when viewed from the upstream side, and FIG. 4B is a longitudinal sectional view of the three-way catalytic device.

DESCRIPTION OF THE PREFERRED EMBODIMENTS

Figure 1:
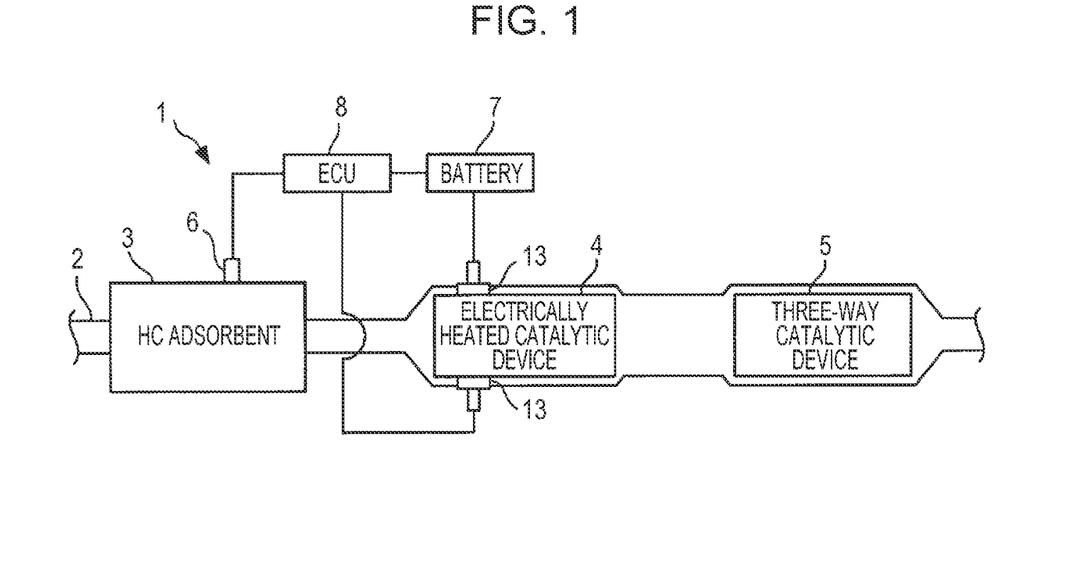
FIG. 1 is a diagram schematically illustrating an exhaust system of an internal combustion engine to which an exhaust-gas purification system according to an embodiment of the present disclosure is applied.

A preferred embodiment of the present disclosure will be described in detail below with reference to the drawings. FIG. 1 is a diagram schematically illustrating an exhaust system of an internal combustion engine to which an exhaust-gas purification system according to the embodiment of the present disclosure is applied. An exhaust-gas purification system 1 is applied to an exhaust system of, for example, a hybrid vehicle that includes an internal combustion engine and a motor as its power sources and is disposed in an exhaust passage 2 of the internal combustion engine.

As illustrated in FIG. 1, the exhaust-gas purification system 1 includes an HC adsorbent 3 (an unburned-constituent adsorbent), an electrically heated catalytic device 4 (a first catalytic device), and a three-way catalytic device 5 (a second catalytic device) that are arranged in this order starting from an upstream side of the exhaust passage 2 (the left-hand side in FIG. 1).

The HC adsorbent 3 is formed of a honeycomb core (not illustrated) on which zeolite is supported, and when an exhaust gas flowing through the exhaust passage 2 passes through the inside of the HC adsorbent 3, hydrocarbon (HC) that is an unburned constituent contained in the exhaust gas is adsorbed by zeolite. When the temperature of zeolite is low (e.g., lower than 100° C.), zeolite adsorbs HC, and when the temperature of zeolite is a predetermined first temperature T1 (e.g., 100° C.) or higher, zeolite desorbs HC that has been adsorbed thereby once.

The HC adsorbent 3 is provided with a temperature sensor 6 that detects the temperature of the HC adsorbent 3. A detection signal of the temperature sensor 6 is output to an ECU 8, which will be described later.

Figure 2:
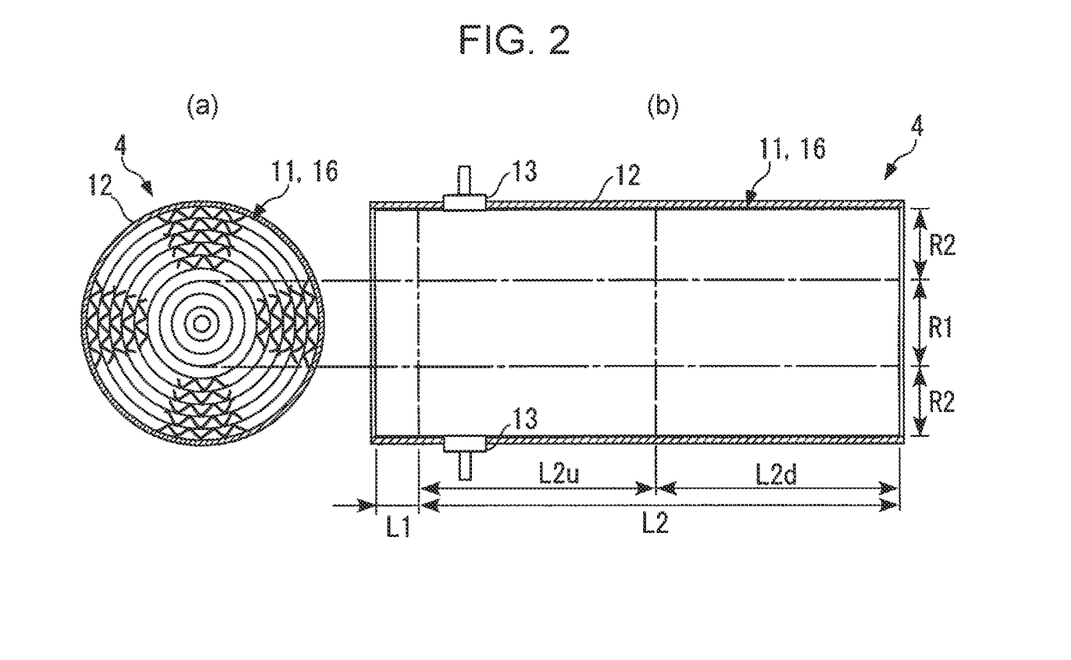
FIG. 2 is a diagram schematically illustrating an electrically heated catalytic device.
Figure 3A:
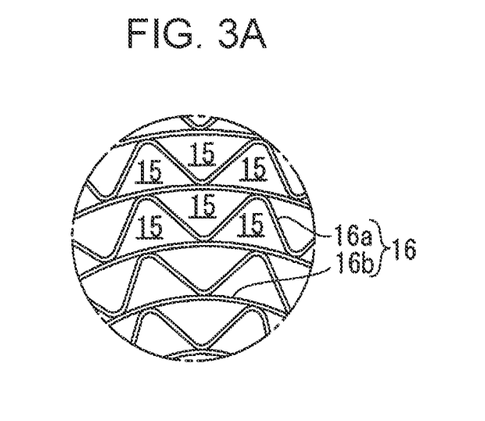
FIG. 3A is an enlarged view illustrating a portion illustrated in FIG. 2(a)
Figure 3B:
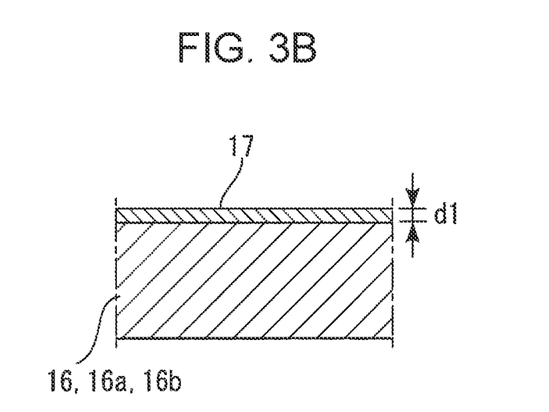
FIG. 3B is an enlarged view illustrating a first catalyst component supported on a honeycomb base.

FIG. 2 illustrates the electrically heated catalytic device 4. As illustrated in FIG. 2, the electrically heated catalytic device 4 includes a honeycomb core 11, an outer cylinder 12 in which the honeycomb core 11 is accommodated, and a pair of electrodes 13 that are electrically connected to the honeycomb core 11 in order to heat the honeycomb core 11. As illustrated in FIGS. 3A and 3B, the honeycomb core 11 includes a honeycomb base 16 (a first support base) that has a large number of honeycomb passages 15 through which the exhaust gas flows, a first catalyst component 17 that is supported on surfaces of the honeycomb base 16, the surfaces defining the honeycomb passages 15, and that contains rhodium (Rh) as a noble metal. Note that the first catalyst component 17 may contain a different noble metal in addition to rhodium.

The honeycomb base 16 has a relatively small predetermined thickness (e.g., 5 μm to 70 μm) and is formed of a certain type of metal foil (e.g., a stainless steel, aluminum, titanium) that has heat resistance. The honeycomb base 16 is formed by stacking metal foil members 16a each having a corrugated plate-like shape (hereinafter suitably referred to as "corrugated foil members 16a") and metal foil members 16b each having a flat plate-like shape (hereinafter suitably referred to as "flat foil members 16b") on top of one another into a whirlpool-like shape and is accommodated in the outer cylinder 12. Note that each of the corrugated foil members 16a and flat foil members 16b is formed by causing the first catalyst component 17 having a very small thickness d1 (e.g., 0.001 µm to 10 µm, and more preferably less than 1 µm) to be supported beforehand on a surface of a piece of metal foil having a flat plate-like shape by a predetermined thin-film treatment.

Arc discharge is used as the above-mentioned thin-film treatment, and a catalyst-layer forming material containing rhodium is evaporated onto the above-mentioned pieces of metal foil. Although not illustrated, for example, the manufacture of a metal foil catalyst using the thin-film treatment using arc discharge is carried out in the following manner. An arc evaporation source and a metal-foil transport device that includes a delivery roller that sends out metal foil and a winding roller that winds up the metal foil are arranged in a vacuum chamber, and the inside of the vacuum chamber is adjusted to a predetermined vacuum atmosphere. Then, the plasma of evaporation particles of a catalyst-layer forming material is radiated from the arc evaporation source onto the metal foil between the delivery roller and the winding roller. As a result, a long-length metal foil catalyst on which the first catalyst component 17 having the above-mentioned thickness d1 is supported can be obtained.

Note that, other than arc discharge, for example, sputtering, ion plating, vacuum deposition, or plating treatment may be employed as the above-mentioned thin-film treatment.

As illustrated in FIG. 2(b), in the honeycomb base 16, the corrugated foil members 16a and the flat foil members 16b are brazed together only in a first region L1 that extends from an upstream end (the left end in FIG. 2(b)) of the honeycomb base 16 toward a downstream side so as to have a predetermined length (e.g., 10 mm). In addition, the first catalyst component 17 is not supported on the first region L1 of the honeycomb base 16 and is supported only on a second region L2 of the honeycomb base 16 that is positioned downstream from the first region L1.

Furthermore, the amount of the first catalyst component 17 supported on the honeycomb base 16 may be set to be uniform over the entire honeycomb base 16, or the amount of the first catalyst component 17 supported on the honeycomb base 16 may be set to differ among predetermined regions of the honeycomb base 16.

For example, as illustrated in FIG. 2(b), it is preferable that the amount per unit volume of the first catalyst component 17 supported on a downstream-side region L2d (a downstream-side half portion) that is an approximately half region of the honeycomb base 16 on the downstream side be set to be larger than the amount per unit volume of the first catalyst component 17 supported on an upstream-side region L2u (an upstream-side half portion) that is an approximately half region of the honeycomb base 16 on the upstream side. In this case, in the honeycomb base 16, the density of the first catalyst component 17 in the upstream-side region L2u is lower than that in the downstream-side region L2d, and thus, as will be described later, when the honeycomb base 16 is heated as a result of power being supplied thereto, the efficiency of heating the honeycomb base 16 can be improved.

As illustrated in FIG. 2(b), it is preferable that the amount per unit volume of the first catalyst component 17 supported on a central region R1 of the honeycomb base 16 in the radial direction of the honeycomb base 16 be set to be larger than the amount per unit volume of the first catalyst component 17 supported on an outer peripheral region R2 of the honeycomb base 16 that is located outside the central region R1. This is due to the following reasons. In other words, in the state where the honeycomb base 16 is heated, when an exhaust gas having a temperature lower than the temperature of the honeycomb base 16 flows into the electrically heated catalytic device 4, the central region R1 of the honeycomb base 16 may sometimes be cooled more than the outer peripheral region R2. Thus, in the honeycomb base 16, by setting the amount per unit volume of the first catalyst component 17 supported on the central region R1 to be larger than that in the outer peripheral region R2 as described above, the activating temperature in the central region R1 is set to be low, so that the catalytic activity effect of the electrically heated catalytic device 4 in the radial direction of the honeycomb core 11 can be uniformly improved.

The above-described honeycomb base 16 is configured to generate heat as a result of power being supplied thereto from a battery 7 so as to be heated to a predetermined temperature. The pair of electrodes 13 are electrically connected to the upstream-side region L2u of the honeycomb base 16, and power is supplied to the honeycomb base 16 from the battery 7 through the electrodes 13. In addition, supply of power to the honeycomb base 16 from the battery 7 is controlled by the ECU 8. As described above, the temperature sensor 6 that detects the temperature of the HC adsorbent 3 is electrically connected to the ECU 8, and heating control of the electrically heated catalytic device 4 is performed in accordance with a detection result obtained by the temperature sensor 6.

For example, when the vehicle is driven by the motor, and the power source of the vehicle is changed to the internal combustion engine, if the temperature of the HC adsorbent 3 is a predetermined second temperature T2 (e.g., 50° C.), which is lower than the first temperature T1, or lower, supply of power to the honeycomb base 16 is started. As a result, after the power source has been changed to the internal combustion engine from the motor, the temperature of the honeycomb base 16 can be increased before the HC adsorbent 3 starts desorbing HC that has been adsorbed thereby once, and activation of the first catalyst component 17 can be facilitated. Note that a heating unit according to the present disclosure includes the battery 7, the ECU 8, the electrodes 13, and so forth.

Figure 4A:
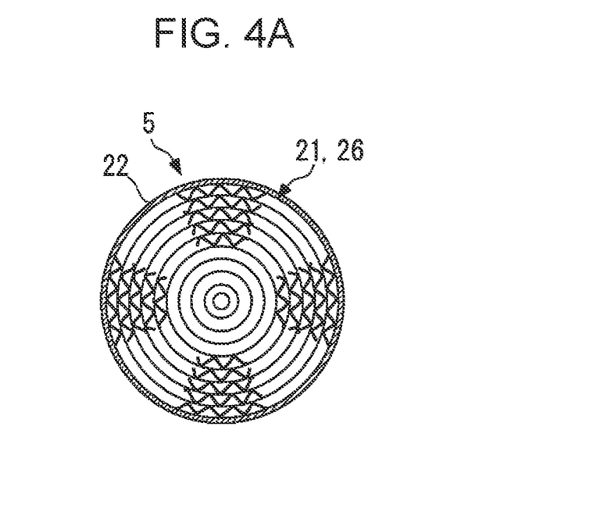
FIGS. 4A and 4B are diagrams schematically illustrating a three-way catalytic device.
Figure 4B:
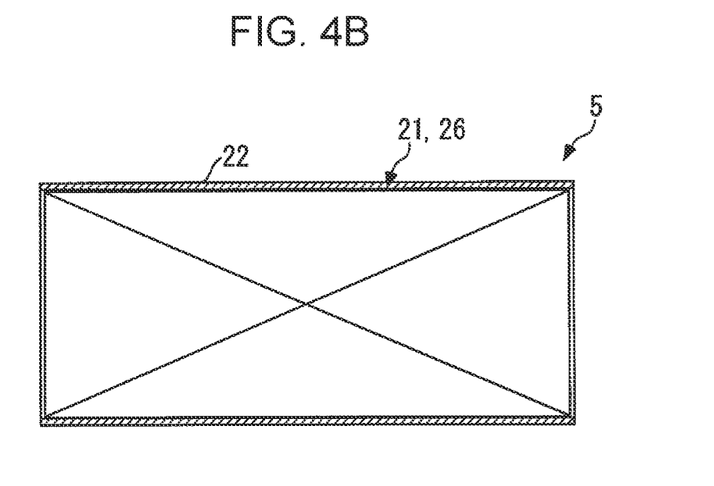
Figure 5A:
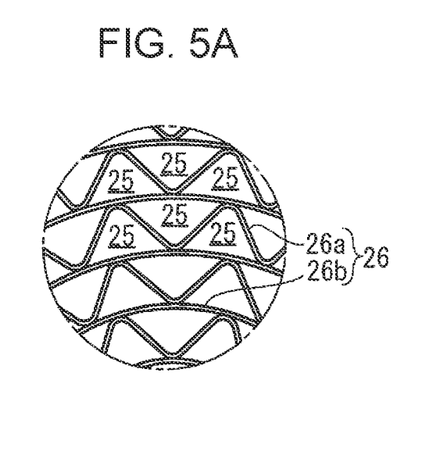
FIG. 5A is an enlarged view illustrating a portion illustrated in FIG. 4A.
Figure 5B:
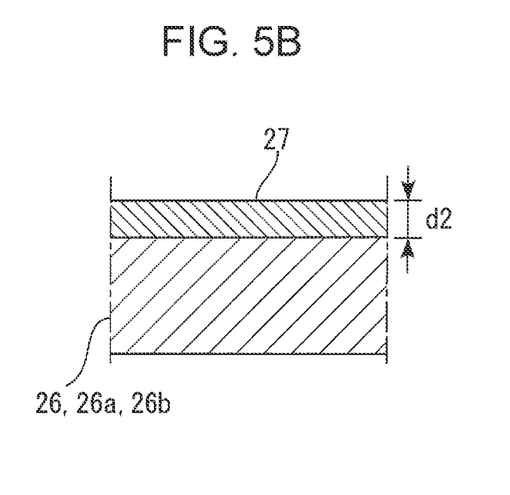
FIG. 5B is an enlarged view illustrating a second catalyst component supported on a honeycomb base.

FIGS. 4A and 4B illustrate the three-way catalytic device 5. The three-way catalytic device 5 includes a honeycomb core 21 that is made of a metal or a ceramic and an outer cylinder 22 in which the honeycomb core 21 is accommodated. As illustrated in FIGS. 5A and 5B, the honeycomb core 21 includes a honeycomb base 26 (a second support base) that has a large number of honeycomb passages 25 and a second catalyst component 27 that is supported on surfaces of the honeycomb base 26, the surfaces defining the honeycomb passages 25, and that contains palladium (Pd) and/or platinum (Pt) as a noble metal. Note that the second catalyst component 27 may contain a different noble metal (e.g., rhodium) in addition to the above-mentioned noble metals.

Similar to the above-described honeycomb base 16 of the electrically heated catalytic device 4, the honeycomb base 26, which is made of a metal, is formed of a certain type of metal foil having a predetermined thickness, and the honeycomb base 26 is formed by stacking corrugated foil members 26a and flat foil members 26b on top of one another into a whirlpool-like shape and is accommodated in the outer cylinder 22. Note that, in the honeycomb core 21 that is made of a ceramic, portions that correspond to the corrugated foil members 26*a* and the flat foil members 26*b* are integrally formed so as to have the large number of honeycomb passages 25.

The second catalyst component 27 has a predetermined thickness d2 that is larger than the thickness d1 of the first catalyst component 17 of the electrically heated catalytic device 4. In addition, the second catalyst component 27 may be supported onto the honeycomb base 26 by a thin-film treatment similar to that employed in the manufacture of the above-described honeycomb base 16 of the electrically heated catalytic device 4. Alternatively, after the honeycomb base 26 having the large number of honeycomb passages 25 has been fabricated, the second catalyst component 27 may be supported onto the surfaces defining the honeycomb passages 25.

In addition, in the three-way catalytic device 5, the total noble metal content per unit volume of the honeycomb base 26 is set to be higher (e.g., eight times to ten times higher) than the total noble metal content per unit volume of the above-described honeycomb base 16 of the electrically heated catalytic device 4.

In the exhaust-gas purification system 1 configured in the manner described above, the operation of the internal combustion engine is started, and the exhaust gas flowing into the exhaust passage 2 is purified by the HC adsorbent 3, the electrically heated catalytic device 4, and the three-way catalytic device 5. More specifically, once the exhaust gas has flowed into the HC adsorbent 3, HC contained in the exhaust gas is adsorbed by the HC adsorbent 3 when the temperature of the HC adsorbent 3 is equal to or lower than the first temperature T1. When the temperature of the HC adsorbent 3 is equal to or lower than the second temperature T2, which is lower than the first temperature T1, energization is started in the electrically heated catalytic device 4, and the honeycomb base 16 is heated before the operation of the internal combustion engine is started. As a result, activation of the first catalyst component 17 of the electrically heated catalytic device 4 is facilitated. In addition, NOx in the exhaust gas is reduced by rhodium contained in the first catalyst component 17 and purified to $N_2$ and $O_2$. Furthermore, once the exhaust gas has passed through the electrically heated catalytic device 4 and flowed into the three-way catalytic device 5, HC and CO in the exhaust gas are oxidized and purified to $CO_2$ by palladium and/or platinum contained in the second catalyst component 27 of the three-way catalytic device 5.

As described in detail above, according to the present embodiment, since the first catalyst component 17 included in the honeycomb core 11 of the electrically heated catalytic device 4 is formed so as to be very thin by the thin-film treatment, that is, the thickness d1 of the first catalyst component 17 is set to 0.001 μm to 10 μm (more preferably, less than 1 μm), the amount of the noble metal, such as rhodium, contained in the first catalyst component 17 can be reduced, and the passage area of each of the honeycomb passages 15 can be increased, so that the pressure loss of the exhaust gas that passes through the electrically heated catalytic device 4 can be reduced. In addition, since the total noble metal content per unit volume of the honeycomb base 26 of the honeycomb core 21 of the three-way catalytic device 5 is higher than the total noble metal content per unit volume of the honeycomb base 16 of the honeycomb core 11 of the electrically heated catalytic device 4, the exhaust-gas purification performance of the three-way catalytic device 5 can be improved. Therefore, according to the exhaust-gas purification system 1 of the present embodiment, the exhaust-gas purification performance of the entire exhaust-gas purification system 1 can be improved while ensuring a reduction in the pressure loss of the exhaust gas flowing through the exhaust passage 2 and a cost reduction.

In the electrically heated catalytic device 4, since the electrodes 13 are electrically connected to the upstream-side region L2*u* of the honeycomb base 16, the upstream-side region L2*u* can be quickly heated by supplying power to the honeycomb base 16 through the electrodes 13. In addition, since the density of the first catalyst component 17 in the upstream-side region L2*u* of the honeycomb base 16 is lower than that in the downstream-side region L2*d*, the efficiency of heating the honeycomb base 16 can be improved. Furthermore, the exhaust gas that has been efficiently heated in the upstream-side region L2*u* of the honeycomb base 16 flows into the downstream-side region L2*d* having an improved purification performance, and thus, the electrically heated catalytic device 4 can further efficiently purify the exhaust gas.

Note that the present disclosure is not limited to the above-described embodiment and can be implemented in various aspects. For example, in the embodiment, although a case has been described in which the present disclosure is applied to a hybrid vehicle, the present disclosure is not limited to this case, and obviously, the present disclosure can also be applied to a vehicle that includes only a gasoline engine or a diesel engine as its power source.

In addition, in the embodiment, although arc discharge, sputtering, ion plating, vacuum deposition, and plating treatment have been mentioned as examples of the thin-film treatment for causing the first catalyst component 17 to be supported on the honeycomb base 16 of the electrically heated catalytic device 4, various thin-film treatments other than those mentioned above may be suitably employed as the thin-film treatment of the present disclosure. The detailed configurations and the like of the exhaust-gas purification system 1, the HC adsorbent 3, the electrically heated catalytic device 4, and the three-way catalytic device 5, which have been described in the embodiment, are merely examples and may be suitably changed within the scope of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An exhaust-gas purification system of an internal combustion engine comprising:
   a first catalytic device that is disposed in an exhaust passage of the internal combustion engine; and
   a second catalytic device that is disposed in the exhaust passage on downstream side of the first catalytic device,
   wherein the first catalytic device and the second catalytic device purifies an exhaust gas that flows through the exhaust passage,
   wherein the first catalytic device includes
      a first support base that is made of a metal and that includes a plurality of first honeycomb passages through which the exhaust gas flows and
      a first catalyst component that is supported on surfaces of the first support base, the surfaces defining the first honeycomb passages, by a predetermined thin-film treatment and that contains one or more types of noble metals, wherein the second catalytic device includes
- a second support base that includes a plurality of second honeycomb passages through which the exhaust gas flows and
- a second catalyst component that is supported on surfaces of the second support base, the surfaces defining the second honeycomb passages, and that contains one or more types of noble metals, and wherein the total noble metal content per unit volume of the second support base is higher than the total noble metal content per unit volume of the first support base, wherein exhaust-gas purification system of the internal combustion engine further comprises:

a heating unit that heats the first support base by supplying power to the first support base, wherein the first support base is configured to be electrically heatable, wherein brazing is performed in a first region that extends from an upstream end of the first support base toward a downstream side so as to have a predetermined length, and wherein the first catalyst component is supported on a second region of the first support base that is positioned downstream from the first region, wherein the first support base includes a plurality of metal foils, the brazing is performed between adjacent metal foils in the first region and brazing is not performed in the second region, and wherein the first catalyst component is not supported on the first region of the first support base.

2. The exhaust-gas purification system of an internal combustion engine according to claim 1, wherein a noble metal contained in the first catalyst component includes rhodium, and wherein a noble metal contained in the second catalyst component includes palladium and/or platinum.

3. The exhaust-gas purification system of an internal combustion engine according to claim 1, wherein, in the first catalytic device, an electrode of the heating unit is electrically connected to the first support base, and wherein an amount per unit volume of the first catalyst component supported on a downstream-side half portion of the first support base is larger than an amount per unit volume of the first catalyst component supported on an upstream-side half portion of the first support base.

4. The exhaust-gas purification system of an internal combustion engine according to claim 3, further comprising:

an unburned-constituent adsorbent that is disposed in the exhaust passage on upstream side of the first catalytic device, the unburned-constituent adsorbent being configured to adsorb an unburned constituent contained in the exhaust gas when a temperature of the unburned-constituent adsorbent is lower than a predetermined first temperature and configured to desorb the unburned constituent when the temperature of the unburned-constituent adsorbent is equal to or higher than the first temperature, wherein the heating unit starts energization when the temperature of the unburned-constituent adsorbent is equal to or lower than a predetermined second temperature that is lower than the first temperature.

5. The exhaust-gas purification system of an internal combustion engine according to claim 1, wherein, in a radial direction of the first support base, an amount per unit volume of the first catalyst component supported on a central region of the first support base is larger than an amount per unit volume of the first catalyst component supported on an outer peripheral region of the first support base that is located outside the central region in the radial direction of the first support base.

6. The exhaust-gas purification system of an internal combustion engine according to claim 5, further comprising:

an unburned-constituent adsorbent that is disposed in the exhaust passage on upstream side of the first catalytic device, the unburned-constituent adsorbent being configured to adsorb an unburned constituent contained in the exhaust gas when a temperature of the unburned-constituent adsorbent is lower than a predetermined first temperature and configured to desorb the unburned constituent when the temperature of the unburned-constituent adsorbent is equal to or higher than the first temperature, wherein the heating unit starts energization when the temperature of the unburned-constituent adsorbent is equal to or lower than a predetermined second temperature that is lower than the first temperature.

7. The exhaust-gas purification system of an internal combustion according to claim 1, further comprising:

an unburned-constituent adsorbent that is disposed in the exhaust passage on upstream side of the first catalytic device, the unburned-constituent adsorbent being configured to adsorb an unburned constituent contained in the exhaust gas when a temperature of the unburned-constituent adsorbent is lower than a predetermined first temperature and configured to desorb the unburned constituent when the temperature of the unburned-constituent adsorbent is equal to or higher than the first temperature, wherein the heating unit starts energization when the temperature of the unburned-constituent adsorbent is equal to or lower than a predetermined second temperature that is lower than the first temperature.

8. The exhaust-gas purification system of an internal combustion engine according to claim 1, wherein the predetermined thin-film treatment is one of arc discharge, sputtering, ion plating, vacuum deposition, and plating treatment.

9. The exhaust-gas purification system of an internal combustion engine according to claim 1, wherein a thickness of the first catalyst component is 0.001 μm to 10 μm.

10. The exhaust-gas purification system of an internal combustion engine according to claim 9, wherein the thickness of the first catalyst component is smaller than 1 μm.

11. The exhaust-gas purification system of an internal combustion engine according to claim 1, wherein the first catalyst component supported on the surfaces of the first support base has a layer structure, the second catalyst component supported on the surfaces of the second support base has a layer structure, and the layer of the second catalyst component is thicker than the layer of the first catalyst component.

12. The exhaust-gas purification system of an internal combustion engine according to claim 1, wherein the first catalyst component includes a first noble metal and the second catalyst component includes a second noble metal, and the first noble metal is different from the second noble metal.

13. The exhaust-gas purification system of an internal combustion engine according to claim 1, wherein, in the first catalytic device, an electrode of the heating unit is electrically connected to an upstream portion of the first support base, the first support base having a downstream portion being located on downstream side of the upstream portion, and wherein an amount per unit volume of the first catalyst component supported on the downstream portion of the first support base is larger than an amount per unit volume of the first catalyst component supported on the upstream portion of the first support base.

\* \* \* \* \*